United States Patent [19]

Peterson et al.

[11] Patent Number: 5,714,734
[45] Date of Patent: Feb. 3, 1998

[54] INSPECTION AND CONTROL OF TITANIUM WELDS

[75] Inventors: David Peterson, Uniontown; Paul J. Berbakov, Norton; Daniel H. Gibson, Alliance, all of Ohio

[73] Assignee: McDermott Technology, Inc., New Orleans, La.

[21] Appl. No.: 747,096

[22] Filed: Nov. 8, 1996

[51] Int. Cl.[6] ................................. B23K 9/095
[52] U.S. Cl. ................... 219/130.21; 219/130.01; 219/137 WM
[58] Field of Search ............... 219/130.21, 130.01, 219/137 WM; 228/103, 104, 105

[56] References Cited

U.S. PATENT DOCUMENTS

| | | | |
|---|---|---|---|
| 2,132,048 | 10/1938 | Robinette | 88/14 |
| 3,271,558 | 9/1966 | Davis | 219/130.21 |
| 3,632,960 | 1/1972 | Erdmann-Jesnitzer et al. | 219/130.01 |
| 4,446,354 | 5/1984 | Kearney | 219/130.21 |
| 4,476,982 | 10/1984 | Paddock et al. | 209/582 |
| 5,157,463 | 10/1992 | Brown et al. | 356/394 |
| 5,233,409 | 8/1993 | Schwab | 356/402 |

*Primary Examiner*—Clifford C. Shaw
*Attorney, Agent, or Firm*—Robert J. Edwards; D. Neil LaHaye

[57] ABSTRACT

An automated process for inspecting and controlling the quality of titanium welds using color recognition. A color sensor and white light source are mounted to a fixture. The fixture is used to traverse the weld or the part being welded is moved in the viewing path of the sensor. The sensor is calibrated to indicate the desired or undesired color of a weld. A recording device such as a computer is used to receive signals from the sensor and record the location of weld colors that indicate an unacceptable weld. Weld parameters are controlled by color feedback to minimize the deposition of unacceptable weld.

7 Claims, 2 Drawing Sheets

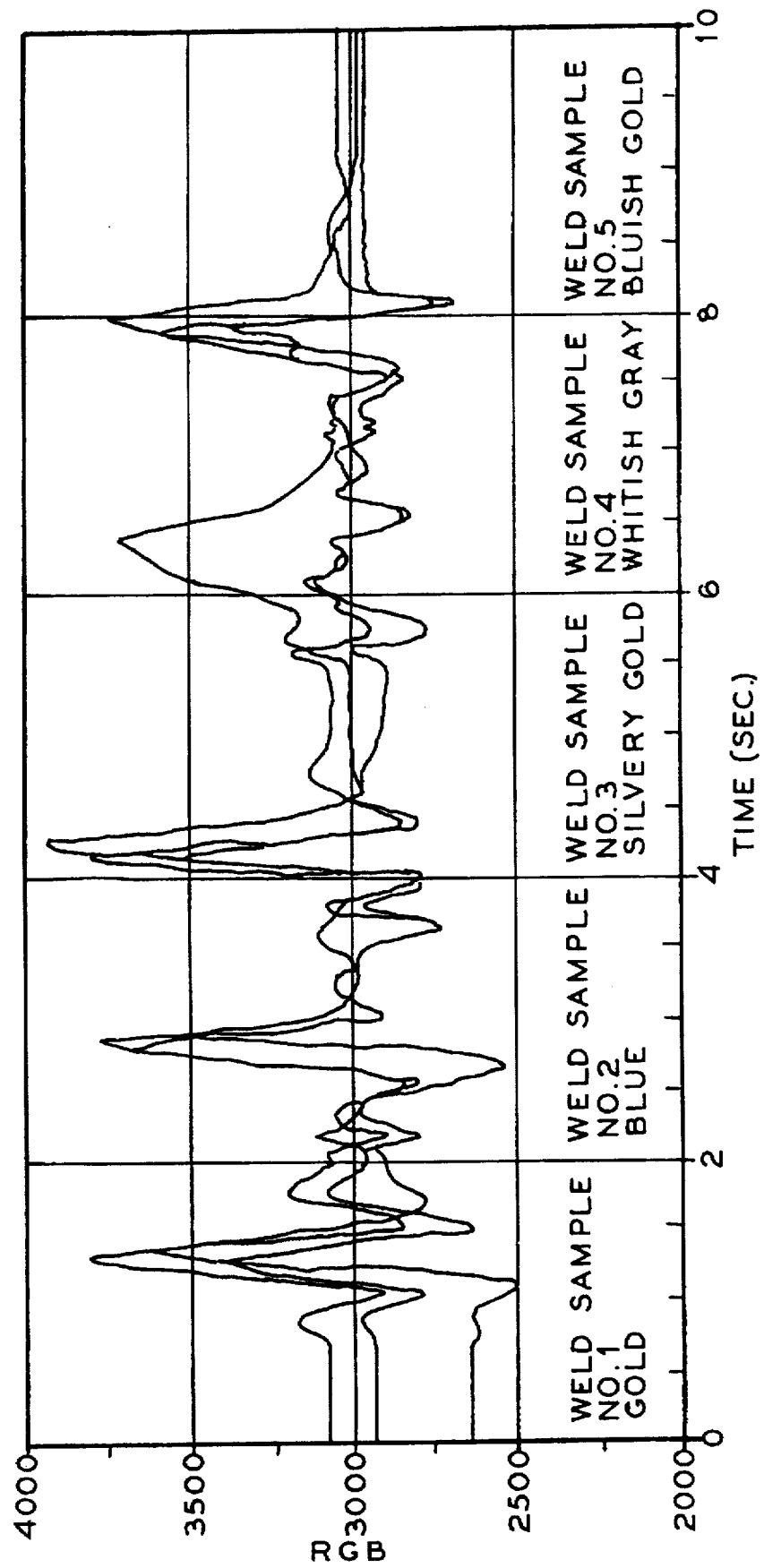

INSPECTION AND CONTROL OF TITANIUM WELDS

BACKGROUND OF THE INVENTION

1. Field of the Invention

The invention is generally related to the inspection of welds and more particularly to the automated inspection and process control of titanium welds.

2. General Background

The color of a titanium weld and the surrounding base material is indicative of the quality of the weld. As a result of this, visual inspection—performed laboriously and with a great deal of subjectivity by an inspector—is the first quality assurance check that is used to accept/reject a weldment after completion. These subjective visual inspections often lead to the need for more costly radiography inspections. Typical titanium weld inspection requirements for visual acceptance criteria are as follows:

| SURFACE COLOR | INDICATION | DISPOSITION |
| --- | --- | --- |
| Silver-shiny | Acceptable shielding | Accept as is |
| Straw to purple discoloration | Reduce shielding | Good, but remove discoloration with stainless steel brush |
| Blue, purple, gold, pink, pastel blue or green | Inadequate shielding | Unacceptable-remove affected area of weld bead |
| Gray, powdery white | Inadequate primary shielding | Unacceptable-remove weld bead and heat affected zone |

As mentioned above, visual inspections by personnel are inefficient due to subjectivity and the welds may be in locations that are not accessible, such as the inside of pipes. This leaves a need for automated inspection and process control of titanium welds. This process eliminates the subjectivity of human visual inspection and provides color feedback to assure quality welds.

SUMMARY OF THE INVENTION

The invention addresses the above need. What is provided is an automated process for inspecting and assessing the quality of titanium welds using color recognition. A color sensor and white light source are mounted to a fixture. The fixture is used to traverse the weld or the part being welded is moved in the viewing path of the sensor. The sensor is calibrated to indicate the desired or undesired color of a weld. A recording and/or controlling device such as a computer is used to receive signals from the sensor and record the location of weld colors that indicate an unacceptable weld. The computer is also used to adjust weld parameters based upon color feedback to obtain acceptable welds in process.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 2 illustrates analog sensor signals from sample welds.

DETAILED DESCRIPTION OF THE PREFERRED EMBODIMENT

Figure 1:
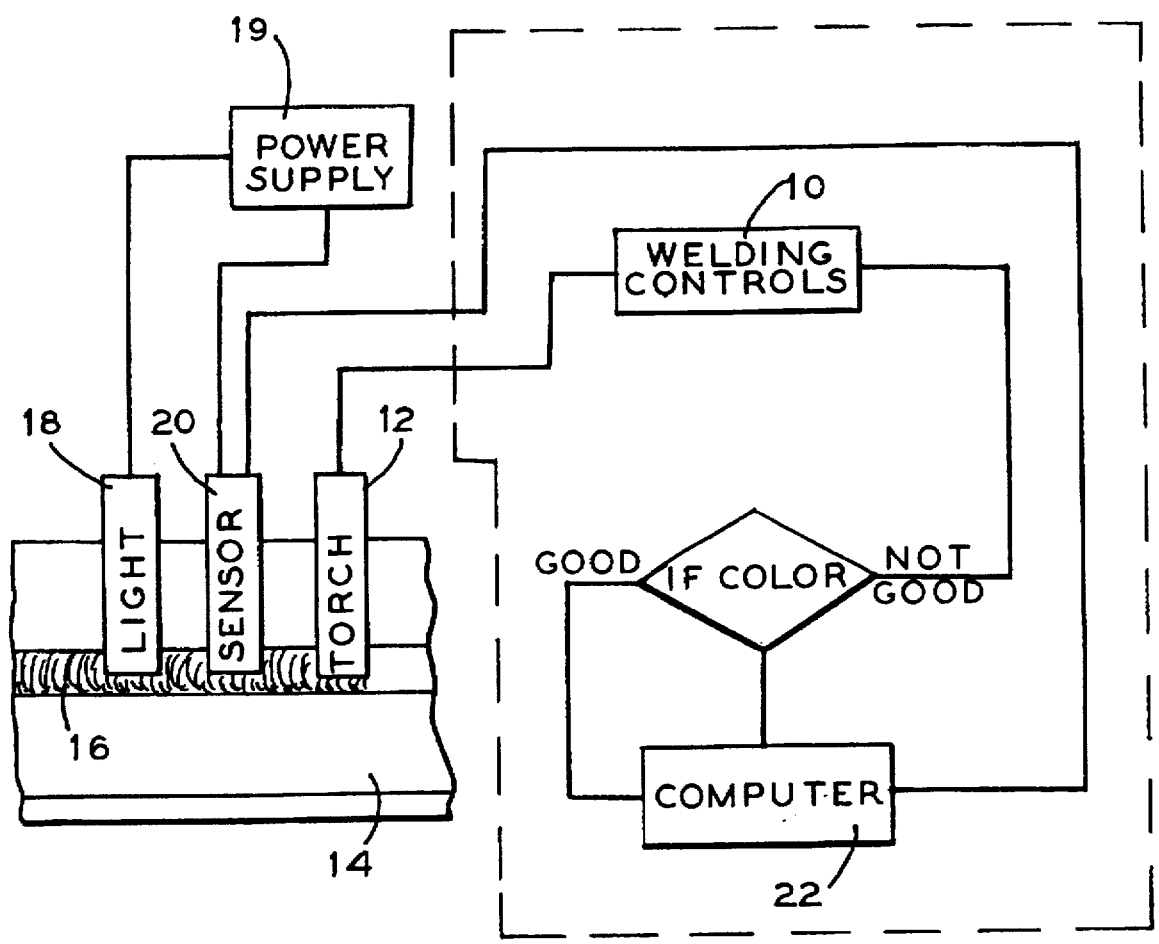
FIG. 1 is a schematic illustration of the invention.

The method of carrying out the inventive inspection and process control is schematically illustrated in FIG. 1. Welding controls 10 are used to control the voltage, current, gas, travel speed, wire feed, etc. of welding torch 12 across work piece 14 to make weld 16. The quality of the weld is monitored by means of light source 18, sensor 20, and computer 22.

The light source 18 is preferably a white light source, such as a halogen light, and is positioned to illuminate the weld 16 such that the sensor 20 receives reflected light from the weld 16. The sensor 20 is of the type that detects the hue, or color, of the weld 16 (by being calibrated to detect the red, blue, and green components of color) as opposed to only the luster, or brightness of the reflected light. Although a sensor that provides only digital signals is acceptable, a sensor that has an analog signal output is preferable because it can be customized to discriminate and identify an infinite number of colors with one setting. A digital sensor provides a signal that corresponds to a weld being acceptable or unacceptable while an analog sensor provides signals that indicate the full range of colors possible on the weld and the full range of weld quality. An example of such an analog sensor is the model FD01 from Wenglor. FIG. 2 illustrates the analog signal output from such a sensor on sample welds. Thus, the signal from the sensor 20 is representative of the weld hue. Power for the light source 18 and sensor 20 is supplied by power supply 19. The light source 18 and sensor 20 may be combined as a single unit.

The signal from the sensor 20 is directed to a computer 22 which records and compares the signals to predetermined values representative of weld surface colors. When sensor values indicate a weld that is unacceptable or requires additional work as described above, the computer 22 logs the location of the weld. The computer 22 is also in communication with the welding controls 10 for receiving information on all aspects of the welding operation. When unacceptable welds are detected, the computer 22 may also be programmed to cause the necessary adjustments in the welding controls 10 to adjust current, voltage, wire feed, etc. to bring sensor values and the weld within acceptable limits.

Test data provided below indicate the feasibility of the invention and how the invention was unexpectedly discovered to be capable of discriminating color more accurately than the human eye. It can be seen from the test results that changes in weld quality that are almost undetectable by the human eye can be easily measured and quantified by use of the invention.

| WELD SAMPLE | BLUE/GREEN (Volts) | RED (Volts) | GRAY LEVEL (Volts) |
| --- | --- | --- | --- |
| #1 Gold | 5.29 | 5.24 | 5.33 |
| #2 Blue | 5.36 | 5.37 | 5.43 |
| #3 Silvery-Gold Acceptable Area | 5.23 | 5.22 | 5.23 |
| #3 Silvery-Gold Rejectable Area | 5.23 | 5.18 | 5.22 |
| #4 Whitish Gray | 5.38 | 5.40 | 5.00 |
| #5 Bluish Gold | 5.41 | 5.42 | 5.35 |

The above test results are average voltages which have not been optimized and illustrate that significant differences in sensor output signal exist among the various sample welds.

During operation, welding torch 12 forms a weld 16 on the work piece 14 and is controlled by welding controls 16.

During welding operations, computer 22 receives input from welding controls 10 and sensor 20. The sensor 20 is calibrated before operations are begun using a color calibration chart or actual weld sample. The sensor 20 provides signals that are representative of the hue of the weld 16 as opposed to only the luster of the weld. A light source 18 provides white light for accurate readings by the sensor 20. The computer 22 is programmed with predetermined signal values that correspond to the range of signals to be received from the sensor 20. Signals indicative of portions of the weld 16 that require additional work or are unacceptable are logged by the computer according to the location of the weld on the work piece. The computer may also be programmed to cause the welding controls 10 to make adjustments in the welding operations to correct the problems in accordance with the variations noted.

Although the above description has been directed to titanium welds, the apparatus and method may also be used for assessing the quality of welds of other metals where the color of the weld is representative of weld quality. Examples of such metals are zirconium and hafnium. The invention may also be useful on a variety of materials that exhibit color when joined, e.g., composite materials and non-metallics such as plastics and polymers for welded or adhesive bonded joints.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for inspecting and controlling titanium welds on a work piece, comprising:
   a. welding control mechanism;
   b. a welding torch head positioned at the work piece, said welding torch head being in communication with and controlled by said welding control mechanism;
   c. a light source positioned to direct light at the weld surface area on the work piece;
   d. a sensor positioned to receive light from said light source that is reflected from the weld surface area on the work piece, said sensor producing signals that are representative of the color of the weld surface; and
   e. a computer in communication with said welding control mechanism for receiving welding process information from said welding control mechanism and for receiving signals from said sensor.

2. The apparatus of claim 1, wherein said light source provides white light.

3. The apparatus of claim 1, where said sensor provides analog signals.

4. An apparatus for inspecting and controlling welds on a work piece where color is determinative of weld quality, comprising:
   a. a welding control mechanism;
   b. a welding torch head positioned at the work piece, said welding torch head being in communication with and controlled by said welding control mechanism;
   c. a light source positioned to direct light at the weld surface area on the work piece;
   d. a sensor positioned to receive light from said light source that is reflected from the weld surface area on the work piece, said sensor producing signals that are representative of the color of the weld surface; and
   e. a computer in communication with said welding control mechanism for sending and receiving welding process information from said welding control mechanism and for receiving signals from said sensor.

5. The apparatus of claim 4, wherein said light source provides white light.

6. The apparatus of claim 4, where said sensor provides analog signals.

7. A method for inspecting titanium welds on a work piece, comprising:
   a. providing a light source directed at the weld;
   b. providing a sensor positioned to receive light reflected from the weld, said sensor being capable of producing signals that are representative of the color of the weld surface; and
   c. directing the signals from said sensor to a recording device that logs the location of welds deemed unacceptable or acceptable according to predetermined signal values.

* * * * *